(12) United States Patent
Vandame et al.

(10) Patent No.: US 8,743,961 B2
(45) Date of Patent: Jun. 3, 2014

(54) METHOD AND DEVICE FOR CODING A VIDEO SEQUENCE INCLUDING AN IMPROVED MOTION VECTOR CALCULATION

(75) Inventors: Benoit Vandame, Betton (FR); Naël Ouedraogo, Acigne (FR)

(73) Assignee: Canon Kabushiki Kaisha, Tokyo (JP)

( * ) Notice: Subject to any disclaimer, the term of this patent is extended or adjusted under 35 U.S.C. 154(b) by 220 days.

(21) Appl. No.: 12/780,122

(22) Filed: May 14, 2010

(65) Prior Publication Data

US 2010/0290531 A1 Nov. 18, 2010

(30) Foreign Application Priority Data

May 18, 2009 (FR) ..................................... 09 02406

(51) Int. Cl.
*H04B 1/66* (2006.01)
*H04N 7/12* (2006.01)
*H04N 11/02* (2006.01)
*H04N 11/04* (2006.01)

(52) U.S. Cl.
USPC ............ 375/240.16; 375/240.08; 375/240.12; 375/240.24

(58) Field of Classification Search
None
See application file for complete search history.

(56) References Cited

U.S. PATENT DOCUMENTS

| | | | |
|---|---|---|---|
| 6,985,527 B2 * | 1/2006 | Gunter et al. ............ | 375/240.16 |
| 7,023,921 B2 * | 4/2006 | Subramaniyan et al. | 375/240.16 |
| 2008/0002770 A1 * | 1/2008 | Ugur et al. ............... | 375/240.16 |
| 2009/0161988 A1 * | 6/2009 | Wredenhagen ........... | 382/278 |
| 2010/0103323 A1 * | 4/2010 | Wredenhagen ........... | 348/699 |

FOREIGN PATENT DOCUMENTS

| | | | |
|---|---|---|---|
| JP | 2008306651 A | * | 12/2008 |
| WO | 02/071758 A2 | | 9/2002 |
| WO | 2004/014060 A2 | | 2/2004 |

OTHER PUBLICATIONS

Yin, H.B., et al., "Motion Vector Smoothing for the Motion Estimation", 2006 IEEE International Conference on Acoustics, Speech and Signal Processing 2006 (ICASSP 2006), Proceedings of ICASSP 2006, pp. II-241-II-244, May 2006.
Shen, J., et al., "Benefits of Adaptive Motion Accuracy in H.26L Video Coding", Proc. Int. Conf. on Image Processing 2000, vol. 1, pp. 1012-1015, Sep. 10, 2000.
Lee, Y., et al., "Prediction and Search Technique for RD-Optimized Motion Estimation in a Very Low Bit Rate Video Coding Framework", Int'l Conf. on Acoustics, Speech and Signal Processing 1997 (ICASSP-97), Germany, IEEE Comp. Soc., vol. 4, pp. 2861-2864, (Apr. 21-24, 1997).

* cited by examiner

*Primary Examiner* — Joseph Ustaris
*Assistant Examiner* — Edemio Navas, Jr.
(74) *Attorney, Agent, or Firm* — Fitzpatrick, Cella, Harper & Scinto

(57) ABSTRACT

To code a video sequence, the similarity is calculated (10) between a block of pixels to code of a current image of the sequence and blocks of pixels of a reference image and at least one motion vector per block of the sequence is determined on the basis of at least one similarity value calculated previously. Furthermore, for at least one block of pixels to code, a prediction (16) is determined of at least one motion vector from neighboring motion vectors that have already been calculated; a final motion vector is determined (18) from similarity values calculated previously for the block to code and on the basis of the predicted motion vector; and the block to code is coded (20) using the final motion vector.

12 Claims, 7 Drawing Sheets

$$zone_1 = \begin{bmatrix} 842 & 35 & 820 \\ 780 & 31 & 795 \\ 820 & 34 & 810 \end{bmatrix}$$

$$zone_2 = \begin{bmatrix} 41 & 35 & 33 \\ 34 & 31 & 38 \\ 41 & 34 & 41 \end{bmatrix}$$

$$zone_3 = \begin{bmatrix} 560 & 542 & 540 \\ 600 & 50 & 300 \\ 750 & 400 & 350 \end{bmatrix}$$

Examples

Zone1 = Elongate structure
Zone2 = Smooth zone (sky)
Zone3 = Textured zone

METHOD AND DEVICE FOR CODING A VIDEO SEQUENCE INCLUDING AN IMPROVED MOTION VECTOR CALCULATION

The present invention relates to a method and device for coding a video sequence.

The types of coding concerned by the invention are the techniques of predictive image coding by blocks based on calculations of similarity between blocks. More particularly, the present invention relates to the improvement of the coding of the motion in such a video sequence.

Still more particularly, the invention is directed to optimizing the calculation of the motion vector fields of the video sequence.

The calculation of the motion vector field of a video sequence is a complex problem.

A particular task of a coder of a video sequence is to predict a block of pixels of the current image from a block of pixels of an image referred to as reference image. For this, it may associate with the block to predict in the current image the block which is the most similar in the reference image.

The relative position of the two blocks defines the motion vector of the block to code in the current image. Thus, the motion vectors characterize the motion of a block of the current image relative to a block of the reference image.

The difference, pixel by pixel, between the two matched blocks defines the residue of the block to code.

In the above case, the motion vectors come from a similarity metric.

By construction, the motion vectors enable an optimal compression of the video sequence. However, the motion vectors field imperfectly expresses the true motion observed, that is to say, resulting for example from the motion of the camera, from the relative motion of filmed objects, etc. This imperfection is all the greater if the images to code suffer from noise.

In practice, the motion vector field appears erratic and incoherent relative to the movements of the camera or of the filmed objects. To be precise, the main function of the calculation of the motion vectors is to provide residues that are as small as possible for an optimal compression, given that this is the only criterion adopted for optimal coding in terms of the compression of the residues.

In a client-server architecture, when a client device receives a video sequence from a server device, it reconstructs the image from the motion vector field and the residues that are associated with the blocks.

If a loss of a set of blocks occurs on transport of the video sequence between the server and the client, the decoder may make error corrections, for example by applying an error concealment technique, for example by image inpainting.

This inpainting is often carried out relative to the reference image, using what are referred to as temporal methods. Thus, the vector fields of the current image and of the image preceding the current image are use to interpolate or extrapolate the missing pixels in terms of motion.

If the motion vector field faithfully represents the true motion of the scene, then the quality of the error correction is in general satisfactory. Conversely, if the motion vector field is erratic, the error correction coming from the same inpainting algorithm is most often of less good quality.

In other words, a motion vector field that is optimal in terms of coding, that is to say in terms of compression, has a tendency to cause to error correction algorithms to give less good performance.

On the other hand, a coherent motion vector field, which enables satisfactory performance to be obtained for the error correction algorithms, does not enable efficient compression rates to be attained.

A coder has several modes for coding an image of a video sequence, referred to as the current image.

An image in the sequence is divided into blocks of pixels that are generally square, termed macroblocks. A macroblock will be designated hereinafter by the abbreviation MB.

In "P" and "B" mode, the current image is associated with a motion vector field. A motion vector represents, for each MB of the current image, a relative translation pointing to a MB of a reference image.

The MB to code is subtracted from the pointed-to MB of the reference image. This subtraction defines the residue. The residue is almost zero if the movement between the reference image and the current image is zero or correctly approximated by a translation. This method, well known per se, is referred to as motion compensation.

For a MB of P type, the coder codes the motion vector, the number of the reference image and the residue transformed by the discrete cosine transform (DCT).

In practice, a MB is generally a square of 16×16 pixels with possibilities for sub-blocks in particular for the MPEG4 and H.264 formats. The reference image is often the image which precedes the current image. Certain video formats such as H.264 or SVC allow a free choice of a reference image with respect to a MB of the current image. The coder selects the best reference image according to an inherent strategy.

The motion compensation makes it possible to obtain an approximation of the current image from the reference image or images according to a vector field representing the translation of each of the MBs of the current image.

As explained earlier, the calculation of the motion vectors is complex. Moreover, it accounts for a large proportion of the coding time. Whether the coding is carried out in real time or is deferred, numerous methods exist for calculating the motion vectors. For a MB of the current image, it is a matter of finding a MB of the reference image such that the residue is a minimum. Thus the optimal motion vector corresponds to the translation between the two MBs producing a minimum residue.

In other words, the two MBs must be the most similar in terms of a similarity metric.

In practice, the similarity metric used is usually the sum of the absolute values of the differences (or SAD, which stands for Sum of Absolute Difference) or the mean of the absolute values of the differences (or MAD, which stands for Mean Absolute Difference). The MAD corresponds to a standardized SAD and has the same properties as the SAD.

The SAD is zero if the two MBs are identical, and very large if they differ enormously. The SAD is therefore an inverse similarity metric.

In order to accelerate coding, processors now include assembler instructions capable of calculating the SAD between several pixels (typically 8 or 16) in a minimum time. The specialized assembler instructions allow coding in real time. The most common are described by the standard "Streaming SIMD Instruction" (SSE) developed for processing units (CPUs) of the x86 family. The SSE standard has also come to be used for other families of embedded processors.

It should be noted that the motion vectors can be calculated with sub-pixel precision, the precision being ½ pixel for the MPEG4—Part 2 standard and ¼ pixel for the H.264 standard. A non-integer motion vector corresponds to a reference MB interpolated by a fraction of a pixel, according to the standard used, in order to make it possible to perform similarity calculations with the MB of the current image. The advantage of calculating the motion vectors with sub-pixel accuracy is to reduce the amplitude of the residues. This optimizes the coding in terms of the compression, with a computational cost increase for the motion vectors.

The paper by H. B. YIN, X. Z. FANG, H. YANG, S. Y. YU and X. K. YANG entitled "Motion vector smoothing for true motion estimation", published in Proceedings of ICASSP 2006, II-241-II-244, May 2006, proposes a method for deducing, from the coded vector field, a motion vector field that is close to the true motion of a video sequence.

This prior method is not satisfactory since, even though it may exploit the different SAD values calculated by the coder, it furthermore requires numerous additional calculations and in particular additional SAD calculations.

The present invention aims to mitigate the drawbacks of the prior art, by making it possible to calculate a motion vector field that is both sufficiently coherent to facilitate the error correction in the images at the client end, and sufficiently efficient in terms of compression of the video signal, while remaining economical in terms of calculation time.

To that end, the present invention provides a method of coding a video sequence constituted by a plurality of images each comprising at least one block of pixels, the method comprising:

a step of calculating similarity, consisting of calculating the value of the similarity, in terms of a predetermined similarity metric, between a block of pixels to code of a current image of the sequence and a plurality of blocks of pixels of a reference image of the sequence;

a step of determining motion vectors, consisting of determining at least one motion vector per block of the sequence from at least one similarity value obtained at the similarity calculating step; the method further comprising, for at least one block of pixels to code:

a step of predicting motion vectors, consisting of determining, for the block of pixels to code, a prediction of at least one motion vector from at least one motion vector that is a neighboring motion vector in terms of a predetermined neighborhood, the neighboring motion vector having been calculated at the motion vector determining step;

a step of determining a final motion vector, consisting of determining, for the block of pixels to code, a final motion vector from similarity values calculated for the block of pixels to code at the similarity calculating step and from the motion vector predicted at the predicting step; and a step of coding pixels, consisting of coding the block of pixels to code using the final motion vector.

Thus, the invention makes it possible to optimize the coding of the motion vector field. It enables the field of the motion vectors to be made more homogenous, the effect of which is not only to facilitate the correction of errors at the client end, but also to enable video compression with better performance.

In other words, the invention enables a motion vector field to be calculated for the compression of an image of a video sequence that is closer to the true motion, while at the same time being close to the motion vector field giving the best possible compression rate.

A particular result of this is that, when applied to macroblocks lost during the transport of the video, the image correction algorithms of temporal type provide corrections of better visual quality.

Furthermore, the invention gives a calculation speed which makes it particularly adapted to coding in real time.

In a particular embodiment, the motion vector predicted at the predicting step is equal to the mean of four motion vectors neighboring the block of pixels to code. This enables fast and robust prediction.

The neighborhood may for example be constituted by the motion vectors associated with blocks of pixels that are at a distance of one, two or three blocks of pixels from the block of pixels to code.

In a particular embodiment, the coding method further comprises:

a step consisting of determining the block of pixels of the reference image for which the value of the similarity relative to the block to code of the current image is an extremum; and a step of constructing a similarity map, consisting of constructing a similarity map around the extremum, from the values of the similarity of the blocks of the reference image that are close, in terms of a proximity criterion, to the block for which the value of the similarity is an extremum.

The similarity measurement between blocks enables the translation motion to be determined between the blocks of the current image and the reference image. It constitutes a robust means for finding a motion vector between a block of the current image and a plurality of blocks of the reference image.

In a particular embodiment in which a block is defined by its coordinates (x,y) and the block for which the value of the similarity is an extremum has as its coordinates $(x_s, y_s)$, the proximity criterion referred to above consists of selecting the blocks whose coordinates satisfy $|x-x_s|<m$ and $|y-y_s|<m$, where m is a predetermined distance.

The proximity criterion makes it possible to simplify the calculations by limiting the number of points of the similarity map, which increases the processing speed, and, moreover, to stay close to the extremum where the similarity map has a simpler shape.

In a particular embodiment, the method further comprises a modeling step, consisting of modeling the similarity map, so as to obtain a model defined by a predetermined number of parameters.

The similarity map is of generally complex shape, which prima facie makes it difficult to model. However, the points of the similarity map close to the extremum are modeled by a simple shape, such as a paraboloid. The fact of only selecting the points close to the extremum of the similarity map thus makes it possible to simplify the modeling of the similarity map.

In a particular embodiment, the modeling step consists of modeling the similarity map in the form of a surface.

In fact a surface constitutes the simplest way to model the similarity map.

In a particular embodiment, the model is a two-dimensional parabolic function.

As explained above, the surface of the similarity map around the extremum is simple. Furthermore, it is concave. A two-dimensional parabolic function enables the surface of the similarity map to be modeled in a simple and satisfactory manner.

In a particular embodiment in which a single predicted vector is determined at the predicting step, at the step of determining the final motion vector, the final motion vector is taken as equal to the motion vector predicted at the predicting step.

This constitutes a fast solution, with avoids calculating the motion vector coming from the extremum of the similarity map.

In another particular embodiment in which a single predicted vector Vpred is determined at the predicting step, the final motion vector determined at the step of determining the final motion vector is defined by $$Vopt = \frac{E \cdot Vmin + Vpred}{E + 1}$$

where:

Vmin is the motion vector corresponding to the extremum of the similarity map and E designates the coding cost increase for the predicted vector Vpred, E being defined by $$E = \frac{\hat{S}_{xy}(Vpred)}{\hat{S}_{xy}(Vmin)} - 1$$

or by $$E = E = \frac{\hat{S}_{xy}(Vmin)}{\hat{S}_{xy}(Vpred)} - 1,$$

where $\hat{S}_{xy}(Vmin)$ and $\hat{S}_{xy}(Vpred)$ are the values of similarity respectively associated with Vmin and with Vpred.

The obtainment of Vopt by weighting of Vmin and Vpred by the weights E and 1, respectively, consists of a barycenter calculation, which is simple and fast to carry out.

In a variant embodiment in which a plurality of predicted vectors Vi are determined at the predicting step, the final motion vector determined at the step of determining the final motion vector is defined as the barycenter of the vectors and of the plurality of predicted vectors Vi respectively weighted by the weights 1/Ei, where Ei designates the coding cost increase of the predicted vector Vi, Ei being defined by $$Ei = \frac{\hat{S}_{xy}(Vi)}{\hat{S}_{xy}(Vmin)} - 1$$

or by $$Ei = \frac{\hat{S}_{xy}(Vmin)}{\hat{S}_{xy}(Vi)} - 1$$

where $\hat{S}_{xy}(Vmin)$ and $\hat{S}_{xy}(Vi)$ are the similarity values respectively associated with Vmin and Vi, Vmin designating the motion vector corresponding to the extremum of the similarity map. As for the preceding embodiment, this variant provides the advantage of consisting of a barycenter calculation that is simple and rapid.

In a particular embodiment, the similarity metric consists of calculating the sum or the mean of the absolute values of the differences between the values of the pixels of a block of the reference image and the values of the corresponding pixels of the block to code of the current image.

The sum or the mean of the absolute values of the differences is a quantity that is very quick to calculate, in particular by virtue of the processors including dedicated machine code for that purpose.

With the same aim as that indicated above, the present invention also provides a device for coding a video sequence constituted by a plurality of images each comprising at least one block of pixels, the device comprising:

a module for calculating similarity, adapted to calculate the value of the similarity, in terms of a predetermined similarity metric, between a block of pixels to code of a current image of the sequence and a plurality of blocks of pixels of a reference image of the sequence;

a module for determining motion vectors, adapted to determine at least one motion vector per block of the sequence from at least one similarity value supplied by the similarity calculating module; the device also comprising:

a module for predicting motion vectors, adapted to determine, for at least one block of pixels to code, a prediction of at least one motion vector from at least one motion vector that is a neighboring motion vector in terms of a predetermined neighborhood, the neighboring motion vector having been calculated by the motion vector determining module;

a module for determining a final motion vector, adapted to determine, for the block of pixels to code, a final motion vector from similarity values calculated for the block of pixels to code by the similarity calculating module and from the motion vector predicted by the predicting module; and a module for coding pixels, adapted to code the block of pixels to code using the final motion vector.

Still with the same aim, the present invention also concerns an information storage means which can be read by a computer or a microprocessor, storing instructions of a computer program, the instructions being adapted to implement each of the steps of the coding method succinctly described above.

Still with the same aim, the present invention also concerns a computer program product able to be loaded into a programmable apparatus, the program comprising sequences of instructions adapted to implement each of the steps of the coding method succinctly described above, when that program is loaded into and executed by the programmable apparatus.

As the particular features and the advantages of the coding device, of the information storage means and of the computer program product are similar to those of the coding method, they are not repeated here.

Other aspects and advantages of the invention will appear from reading the following detailed description of particular embodiments, given by way of non-limiting example. The description refers to the accompanying drawings, in which.

Figure 1:
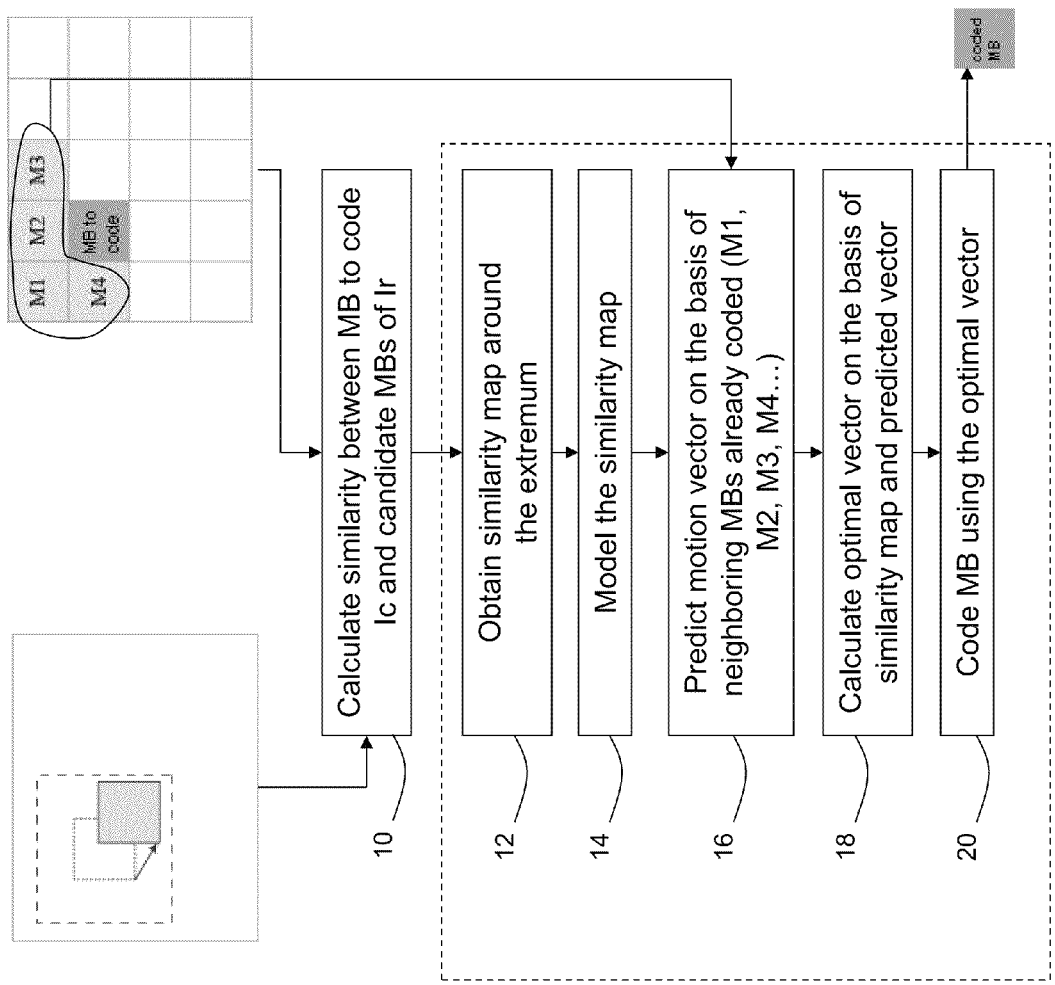
FIG. 1 is a flow diagram illustrating the mains steps of a method of coding a video sequence in accordance with the present invention, in a particular embodiment.

In accordance with the present invention, in order to make the motion vector field of an image coded in predictive mode more coherent with the true motion observed in a scene of a video sequence including that image, it is sought to calculate the motion vectors which are correlated as much as possible with the neighboring motion vectors.

The neighboring motion vectors are defined here as being the motion vectors associated with neighboring MBs covering the same image portion whose own motion is coherent. The neighboring MBs of a given MB are defined as MBs that are at a distance of a predetermined number of MBs from the given MB: the neighboring MBs are typically the MBs at a distance of 1, 2 or 3 MBs from the given MB.

The fact of choosing a motion vector that may possibly be different from that giving an optimal compression implies a coding cost increase. This is because, as explained by way of introduction, a vector which is chosen to be coherent with the true motion is generally not optimal in terms of the compression of the video signal.

In accordance with the invention, it is decided to estimate this cost increase and to tolerate it to a certain extent, the objective being to obtain a motion vector field that is more coherent in terms of the motion, while controlling the impact of the choice of such a motion vector on the coding cost.

In the following description a video coded by blocks is considered, within the meaning defined by the Moving Picture Experts Group consortium (MPEG), such as in the MPEG4—Part 2 and H.264 standards, these examples being provided by way of non-limiting example.

In accordance with the present invention, for at least one block of pixels of an image of a video sequence to code, a motion vector is chosen called "final" motion vector, that is considered as optimal in terms of the representation of the motion observed in the video scene including that image, the choice of this final motion vector being made:
  on the basis of a predicted motion vector, the predicted vector being obtained by using for example motion vectors of neighboring blocks; and
  and on the basis of an evaluation of the cost increase induced by that predicted vector. This coding cost increase is estimated on the basis of similarity calculations between the block of pixels to code of the current image and blocks of a reference image for the current image.

The predicted vector, which is particularly advantageous from the point of view of the representation of the motion in the scene, may be different from that which provides an optimal compression.

On searching for the best motion vector for a MB of the current image, the coder tests various candidate MBs of the reference image. The candidates are generally included in a delimited search zone. For each candidate, which is associated with a motion vector, a SAD value is calculated. Each of these values defines a point on a so-called SAD error shape representing the value of the SAD according to the motion vector. More generally, the term similarity map is used.

The similarity map has a complex shape. The coder seeks its absolute minimum. The search may be exhaustive, that is to say that all the points in this function are calculated, or iterative, with a partial search that is essential for real-time coding. A three-step search algorithm can be applied, where the search is made for translations divisible by 8, then around the minimum found, the search continues for translations divisible by 4, and so on as far as a resolution of 1, ½ or ¼ pixel.

The local shape of the similarity map or "SAD error shape" around the minimum detected by the coder gives an indication as to the nature of the MBs. For example, if the MBs compared are highly textured, then the shape of the similarity map around the minimum is very narrow (the values of the similarity map around the minimum are very much greater than that minimum) and, conversely, for MBs constituted by pixels that are almost constant, the shape of the similarity map around the minimum is very splayed (the values of the similarity map around the minimum are very slightly greater than that minimum).

In accordance with the present invention, the shape of the similarity map around the minimum detected by the coder is analyzed, in order to estimate the cost of coding a motion vector which does not correspond to the minimum of the similarity map.

For a MB to code, denoted Mc, the similarity map around the minimum is calculated then modeled by a paraboloid surface.

The coordinates of the minimum of the paraboloid surface correspond to the value of the best motion vector which has the smallest possible residue.

In parallel with that calculation, another motion vector is predicted, on the basis of motion vectors neighboring the MB to code which have already been calculated.

In practice, the motion vectors are often calculated in a lexicographical order. Thus, for a MB Mc to code, the motion vector situated above and that situated to the left of Mc are already known.

The mean of the neighboring motion vectors gives a prediction of the motion vector of Mc. This prediction is correlated with the true motion, since it is linked to the motion vectors of the neighboring MBs.

The paraboloid model of the similarity map for Mc enables the local error to be estimated, for example in the form of the sum of the absolute differences (SAD), for the predicted motion vector.

This value is compared to the minimum value of the SAD.

The optimal motion vector associated with Mc is then defined as a weighting taking into account the predicted motion vector and the best motion vector. Different weightings are possible, as described in detail later.

The flow diagram in FIG. 1 illustrates the main steps 12, 14, 16, 18 and 20 of the coding method in accordance with the present invention as well as step 10 performed by the coder. These steps are detailed below.

Step 10 consists of a similarity calculation made by the coder for calculating the motion vector, as follows. This step is carried out conventionally in a video coder.

For a macroblock Mc to code of the current image Ic, the coder tests various macroblocks Mxy of the reference image Ir, in order to find the macroblock $Mx_s y_s$ the most similar to Mc according to a similarity metric denoted s. The motion vector Vxy=(x,y) corresponds to the translation between the coordinates of Mc and Mxy.

It is to be recalled that the MBs to code are aligned on a grid according to the video standard used. In practice, a MB is typically the size of a square of 16×16 pixels and the MBs to code are aligned on a grid of 16×16 pixels. Some recent video standards make it possible to code MBs in several sub-MBs of smaller size, such as for example 8×8, 4×4, 4×8 or 8×4 pixels for the H.264 standard.

The macroblocks Mxy of the reference image Ir are freely positioned and are of the same size as the macroblock to code Mc. The coder seeks the macroblock Mxy such that the similarity measurement Sxy=s(Mxy,Mc) between Mxy and Mc is minimal or maximal with respect to all the Mxy candidates. The estimator s is said to be direct or inverse depending on whether the self-similarity s(Mc,Mc) is maximal or zero, respectively. For example, the SAD is an inverse similarity estimator, since SAD(Mc,Mc)=0, whereas intercorrelation is a direct estimator.

Figure 2:
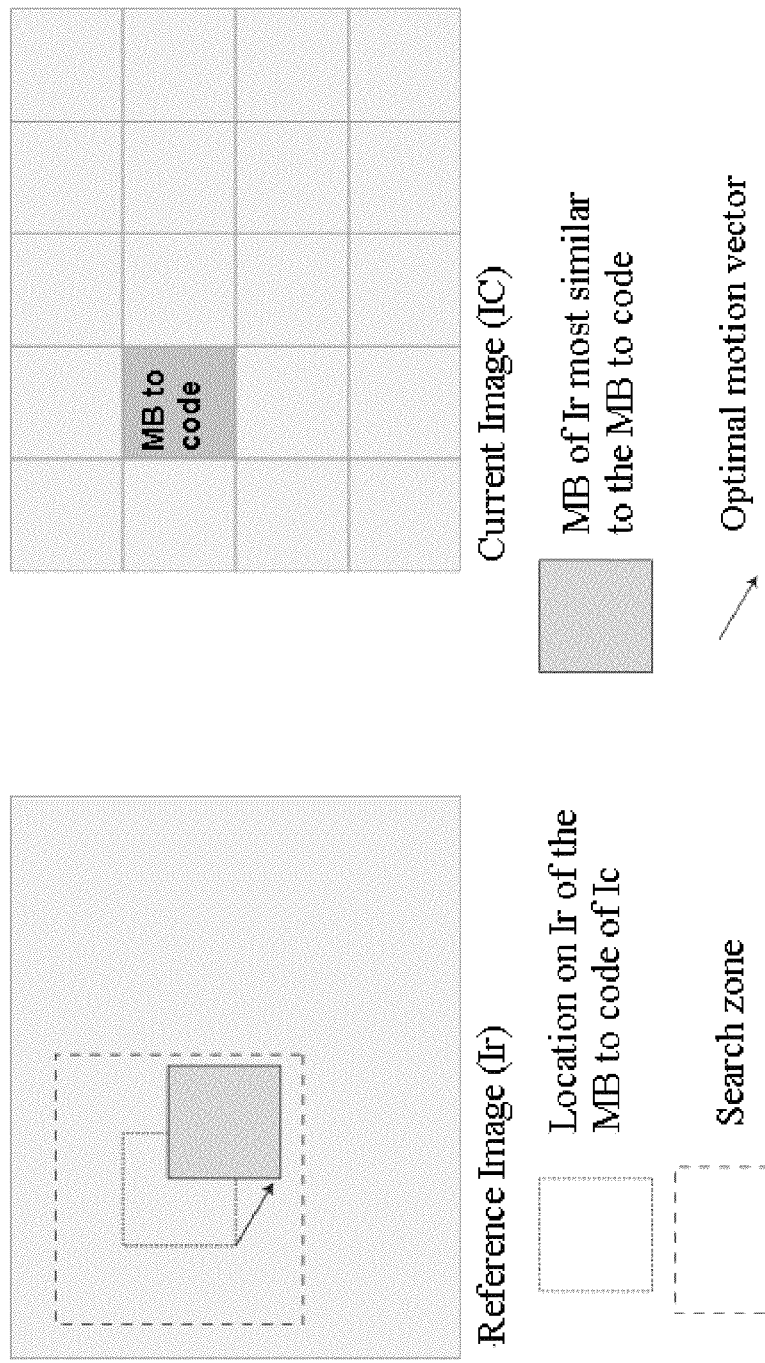
FIG. 2 is a diagrammatic representation of the motion estimation calculation for a macroblock to code of the current image on the basis of a reference image.

The search set of the Mxy is defined by the coder. A search window is defined in order to specify the maximum and minimum coordinates of the motion vectors sought, for example $(x,y) \in R^2 / |x| < t, |y| < t$, where R designates the set of real numbers and t is the size of the window or search zone (this zone is shown in dotted lines in FIG. 2).

The coordinates x and y can be integer or not, according to the video standard used. In the case of MPEG4—Part 2, the coordinates are multiples of ½, while for H.264 they are multiples of ¼.

In order to calculate the similarities with non-integer translations, it is necessary first of all to translate the pixels of the reference image Ir according to an interpolation specified by the standard used.

The coder generally proceeds by iterative searches commencing with integer coordinates such that $(x,y) \in N^2$ where N designates the set of natural integers. When the macroblock $Mx_e y_e$ with integer translation $(x_e, y_e)$ the most similar to Mc is found, the coder seeks at a sub-pixel resolution the macroblock $Mx_s y_s$ with non-integer translation $(x_s, y_s)$ most similar to Mc. It is generally observed that $|x_e - x_s| < 1$ and $|y_e - y_s| < 1$.

In an original manner, described later, the invention exploits the different values of similarity measurement Sxy calculated by the coder when the latter calculates the motion vectors for each block of pixels to code. On the contrary, in a conventional coder, the similarity values calculated by the coder only serve to find an extremum (for example, this extremum is a minimum when the similarity estimator is the SAD), this extremum corresponding to the motion vector to be chosen, in conventional coding, for the block considered.

Figure 3:
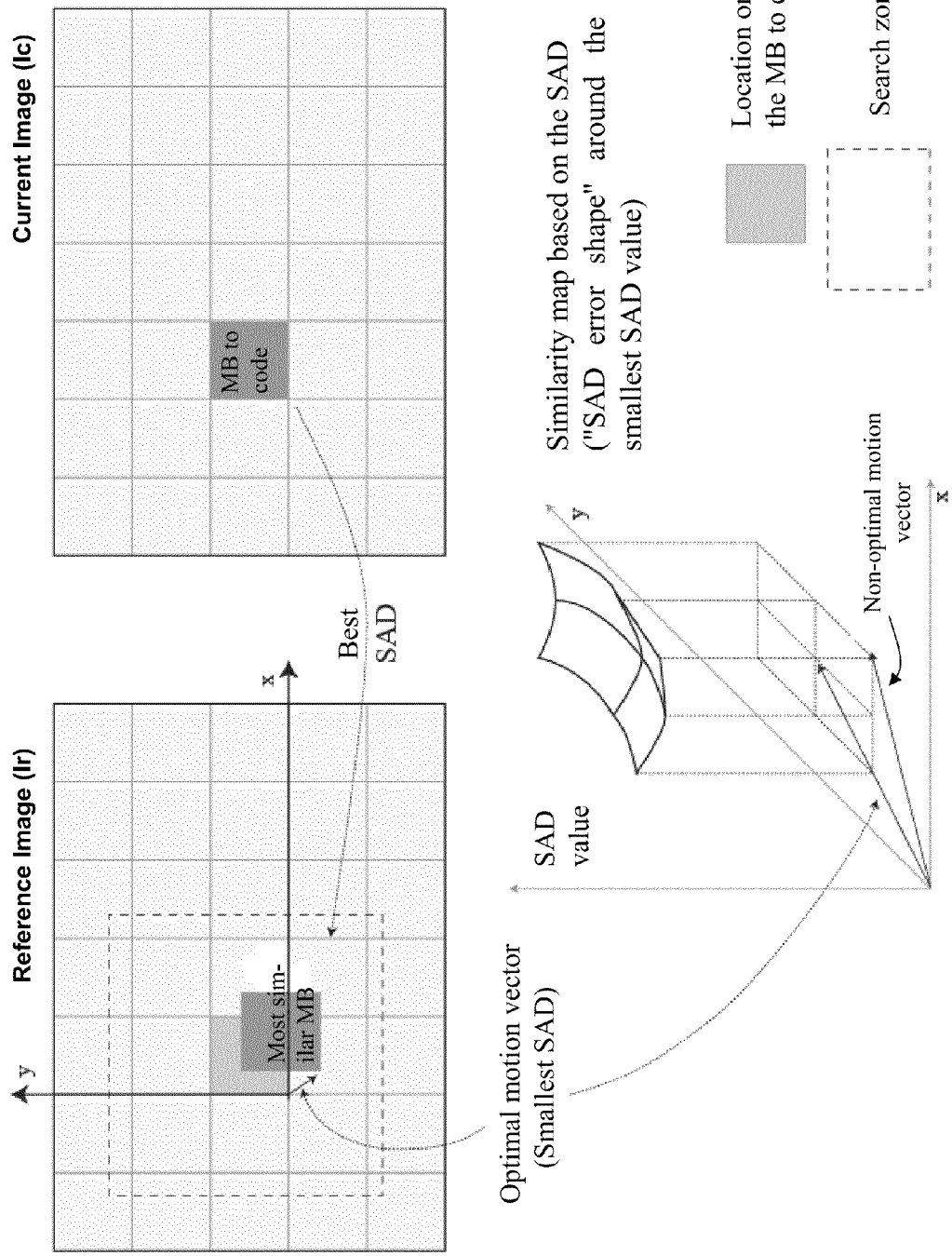
FIG. 3 illustrates a particular example of a similarity map calculated by an image coder.

The values Sxy define a partial sampling of a two-dimensional surface called a similarity map (SMap), as illustrated in FIG. 3. The shape of the SMap is complex and depends on the nature of the MB to be coded Mc and the reference image Ir. At the point $(x_s, y_s)$, the SMap is minimal or maximal (according to the estimator s).

As the flowchart of FIG. 1 shows, step 12 consists of obtaining the values Sxy of the similarity map around the extremum $(x_s, y_s)$, the values Sxy already having been calculated by the coder on searching for the motion vector for each block.

For this purpose, a proximity criterion is chosen. For example, only the Sxy values such that $|x - x_s| < m$ and $|y - y_s| < m$, are adopted, where m is a distance defining a selection window. The parameter m is typically equal to 1. The number $n_s$ of points Sxy selected by the proximity criterion depends on the number of intermediate calculations made by the coder, as well as the proximity criterion.

The following step 14 consists of modeling the similarity map. The model $\hat{S}_{xy}$ is chosen in order to characterize the extremum of the similarity map at the point $(x_s, y_s)$. It is calculated by virtue of the various values of the similarity measurements Sxy close to the extremum according to the proximity criterion. This model is chosen so as to be simple, such as a Gauss function, or a parabola. This type of model is particularly well adapted to stationary signals and in particular to signals coming from the similarity calculation.

The parameters of the model are for example calculated by the least error squares method, or by other methods particular to the model.

In practice, a paraboloid model enables a simple and efficient calculation by the least error squares method.

In order to determine the parameters of the model $\hat{S}_{xy}$, a minimum number of measurements of the similarity Sxy should be obtained. For example, a two-dimensional parabolic model is described by 6 parameters. Consequently, if $n_s$ is less than 6, it is necessary to calculate other values of Sxy, not calculated by the coder and close to the extremum point $(x_s, Y_s)$ according to the proximity criterion. These supplementary calculations are rapid since the coder has an effective estimator s.

Figure 4:
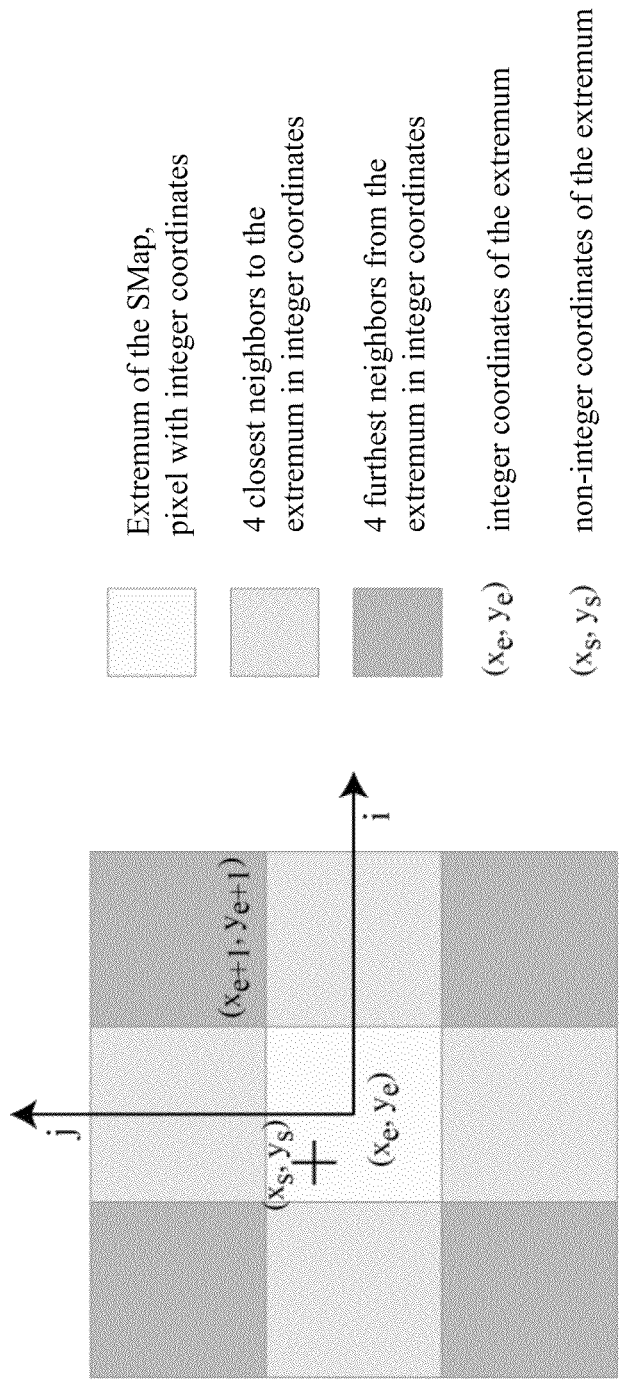
FIG. 4 illustrates a particular example of a similarity map for 9 pixels around an extremum.

It should be noted that the majority of coders typically supply $n_s = 10$ values for the motion vectors of integer coordinates; other measurements are made at sub-pixel resolutions. Thus it is frequent for the similarity values for integer coordinates $(x_e + i, y_e + j)$ to be naturally calculated by the coder, the pair (i,j) defining the 4 or 8 closest neighbors of $(x_e, y_e)$, as illustrated in FIG. 4.

The following step 16 consists of predicting a motion vector on the basis of the neighboring motion vectors already calculated.

In accordance with the invention, it is sought to determine a motion vector field that is the closest possible to the true motion of the video sequence.

For given MB, a motion vector is predicted.

Various methods may be used to predict a motion vector that is coherent relative to the true motion of the filmed scene. One of these methods is described below by way of example that is in no way limiting.

Generally, the MBs are coded successively. On coding Mc, the three MBs above and the one on the left are already known.

The predicted vector, denoted Vpred, is then calculated on the basis of these four known motion vectors, denoted Vi.

For example, let Vpred=(V1+V2+V3+V4)/4. In other words, the predicted vector is equal to the mean of the four neighboring motion vectors of the MB to code.

As FIG. 1 shows, step 18 which follows predicting step 16 consists of calculating the optimal motion vector on the basis of the similarity map and the predicted motion vector.

By virtue of the model $\hat{S}_{xy}$, it is possible to estimate the similarity between Mc and a reference MB at a distance of any motion vector.

The best motion vector is that which enables the smallest possible residue to be obtained. It corresponds to the extremum of the similarity map.

This motion vector, denoted Vmin, is deduced by an analysis of the parameters of the model which enables an absolute calculation of the position of the extremum.

Knowing the vectors Vmin and Vpred as well as the associated similarity values $\hat{S}_{xy}(Vmin)$ and $\hat{S}_{xy}(Vpred)$, it is sought to calculate an optimal motion vector, denoted Vopt, of similarity $\hat{S}_{xy}(Vopt)$, such that Vopt is the closest possible to $\hat{S}_{xy}(Vmin)$.

Numerous criteria enable Vopt to be calculated.

The following criterion is adopted, involving the concept of coding cost increase.

The coding cost increase E of the predicted vector Vpred is defined in the following way:

$$E = \frac{\hat{S}_{xy}(Vpred)}{\hat{S}_{xy}(Vmin)} - 1$$

if the similarity estimator is of inverse type (of the SAD type), or else $$E = \frac{\hat{S}_{xy}(Vmin)}{\hat{S}_{xy}(Vpred)} - 1$$

if the similarity estimator is of direct type (of the correlation type).

The coding cost increase E is thus a strictly positive value, which is almost zero if the vectors Vmin and Vpred are very similar or if the shape of $\hat{S}_{xy}$ is very splayed in at least one direction.

The optimal motion vector is defined as follows:

$$Vopt = \frac{E \cdot Vmin + Vpred}{E+1}.$$

Thus, Vopt is very similar to Vpred if E is only slightly greater than zero and Vopt is very similar to Vmin if E is very much greater than zero.

Where N predicted vectors Vi are available, the above equations are easily generalized, such that Vopt is defined as the barycenter of the vectors Vi respectively weighted by the weights 1/Ei, where Ei is the coding cost increase associated with the predicted vector Vi, Ei being defined by $$Ei = \frac{\hat{S}_{xy}(Vi)}{\hat{S}_{xy}(Vmin)} - 1$$

or by $$Ei = \frac{\hat{S}_{xy}(Vmin)}{\hat{S}_{xy}(Vi)} - 1$$

where $\hat{S}_{xy}(Vmin)$ and $\hat{S}_{xy}(Vi)$ are the values of similarity respectively associated with Vmin and Vi, Vmin designating the motion vector corresponding to the extremum of the similarity map.

The optimal motion vector so calculated may then be used for the following part of the coding of the macroblock to code Mc, at coding step 20, which is carried out in accordance with the chosen video standard.

When all the MBs of the current image have been thus coded, a motion vector field results which is coherent relative to the true motion of the video sequence.

A particular example of embodiment of step 14 of modeling the similarity map will now be described in more detail.

In order to simplify the writing of the indices, the following reference change is considered: $i=x-x_e$ and $j=y-y_e$. This is a translation by the vector $(x_e,y_e)$. The similarity measurement Sxy therefore becomes Sij, the extremum in integer coordinates $(x_e,y_e)$ becomes (0,0) and the extremum in non-integer coordinates $(x_s,y_s)$ becomes $(i_s,j_s)$.

For this particular embodiment example, the following parameters and conditions are defined:

The similarity estimator used by the coder is the SAD (or else the MAD).

The model $\hat{S}_{ij}$ is a two-dimensional parabolic function that is described by 6 parameters A, B, C, D, D, F, of the form:

$$\hat{S}_{ij} = A.i^2 + B.j^2 + C.i.j + D.i + E.j + F \qquad (1)$$

Only the similarities Sij for integer values of i and j are adopted.

The selection window contains the 9 values Sij, where i and j independently take the values (−1; 0; 1). If the coder does not supply all these values, it is necessary to calculate them. FIG. 4 illustrates the 9 values adopted around the extremum of the SAD.

Figure 5:
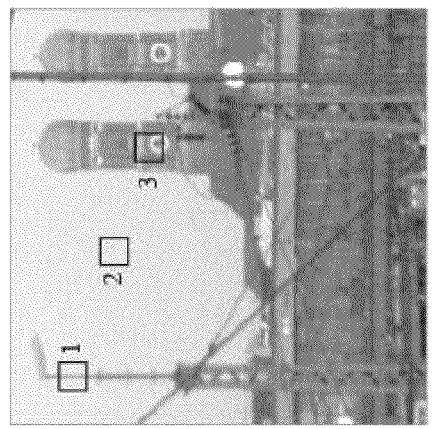
FIGS. 5 and 6 illustrate a particular example of a parabolic model for the similarity map.

The six parameters of the parabolic model $\hat{S}_{ij}$ described by equation (1) are calculated by means of the 9 Sij values by the conventional method of least error squares. FIG. 5 illustrates the 9 values of SAD for MBs representing portions of images of different natures (elongate in zone 1, homogeneous in zone 2, textured in zone 3).

Figure 6:
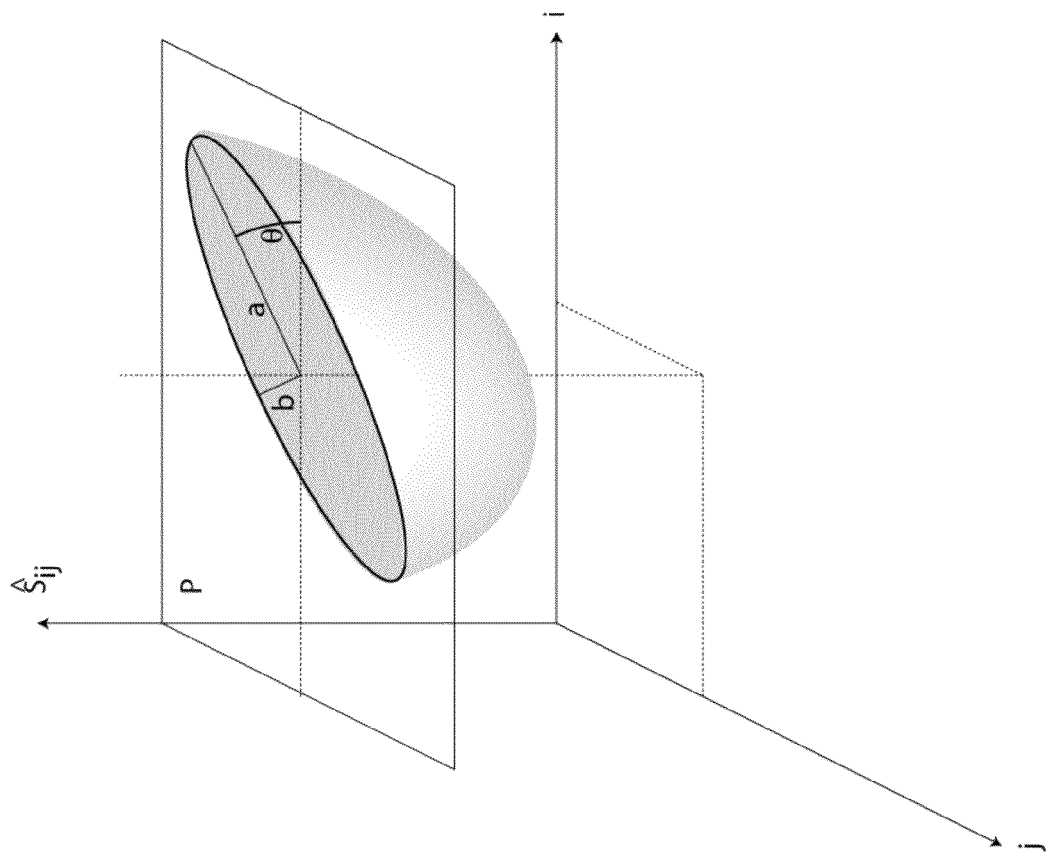

The parabolic model is in fact an elliptical paraboloid surface, as illustrated in FIG. 6. The plane P cuts the elliptical paraboloid surface in an ellipse, which is characterized by a semi-major axis a, a semi-minor axis b, and an orientation θ. The parameters a, b and θ of the ellipse are derived from the following system of equations:

$$\begin{cases} \theta = \frac{1}{2}\text{Arctan}\left(\frac{C}{A-B}\right) \\ a = 1/(A\cos\theta + B\sin\theta - C\cos\theta\sin\theta)^2 \\ b = 1/(A\sin\theta + B\cos\theta + C\cos\theta\sin\theta)^2 \end{cases} \qquad (2)$$

where A, B and C are the parameters of the parabolic model $\hat{S}_{ij}$ described by equation (1) above. The system of equations (2) illustrates the well-known properties of elliptical paraboloids.

It is observed that:
- the ellipse is oriented along the principal edge of the pixels of the MB to be coded Mc;
- the ellipse is very small (a and b small) if the content of Mc is very textured (many high frequencies);
- the ellipse is very large (a and b large) if the signal contained in Mc is very homogeneous (no high frequencies);
- the ellipse is very squashed (a>>b) if a contrasted edge appears on Mc.

A particular embodiment example of step 16 of obtaining the predicted vector will now be described in more detail.

As described earlier, the predicted vector Vpred of the macroblock to code Mc is obtained on the basis of its neighbors. One improvement consists of obtaining the vector Vpred in the same way as the coder.

To be precise, the different video coders code a motion vector differentially relative to a normalized prediction based on the neighboring motion vectors. For example, in the H.264 standard, the normalized prediction consists of selecting the median vector from among the motion vectors of the neighboring blocks. Thus, if the vector predicted by the coder for the coding of a MB is denoted Vcod, the motion vector V of a MB is coded V−Vcod.

It is deduced therefrom that if a motion vector V is equal to Vcod, then V has the lowest coding cost relative to any other possible motion vector.

If Vopt=Vpred=Vcod is chosen and that motion vector has a coding cost increase that is tolerable according to a tolerance threshold defined by the user, that motion vector gives both the advantage of being coherent relative to its vicinity and the advantage of giving a residue that is almost as low as that obtained by the extremum of the similarity map. The coding cost increase may be estimated on the basis of the similarity values calculated for the processed block, according to the formulae stated above.

Figure 7:
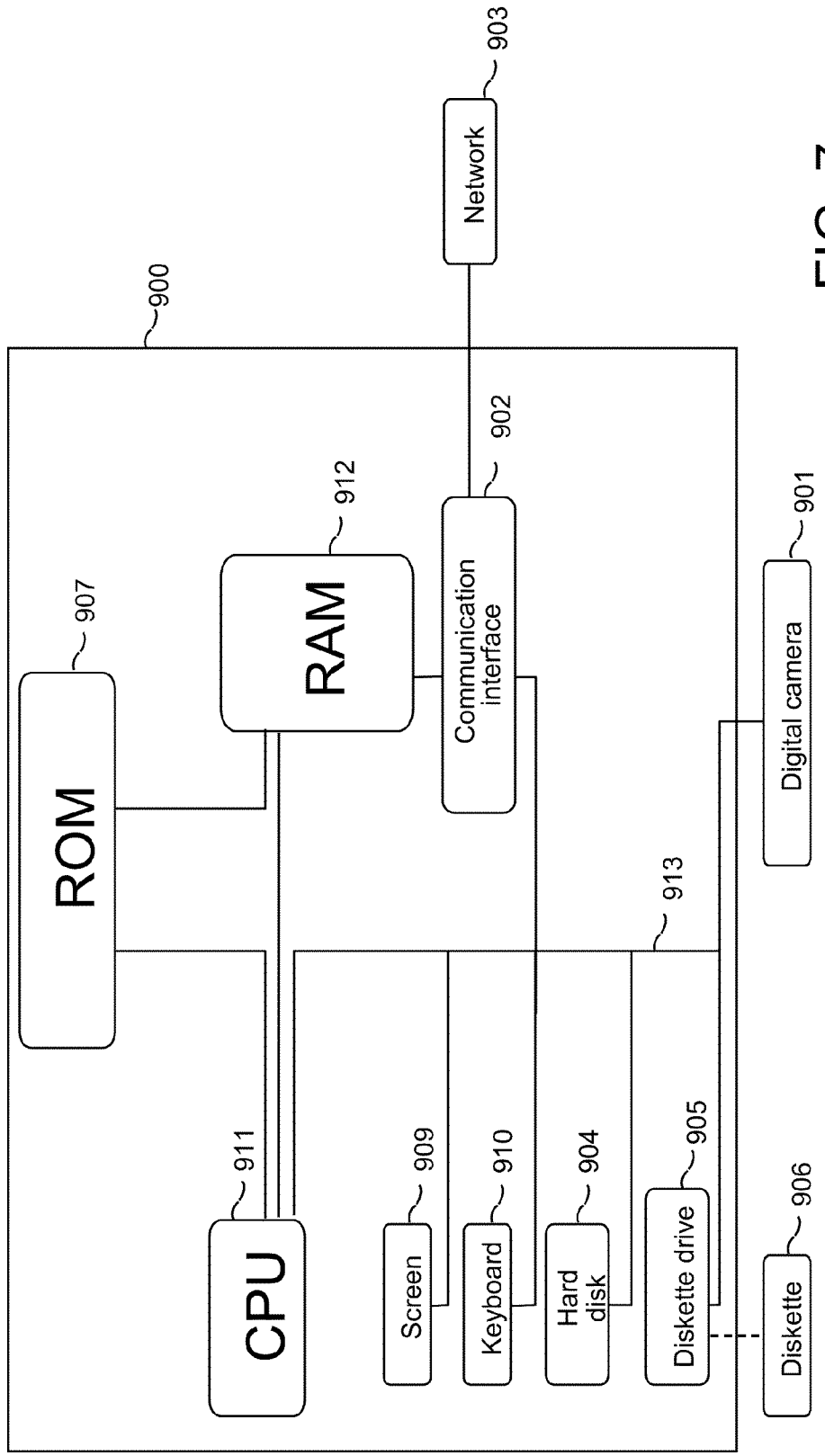
FIG. 7 is a diagrammatic representation of a particular embodiment of an apparatus able to implement the present invention.

FIG. 7 shows a particular embodiment of an information processing device adapted to operate as a device for coding a video sequence according to the present invention.

The device illustrated in FIG. 7 can comprise all or part of the means for implementing each of the steps of the coding method described above.

According to the embodiment chosen, this device may for example be a microcomputer or a workstation 900 connected to various peripherals, for example a digital camera 901 (or a scanner, or any other image acquisition or storage means) connected to a graphics card (not shown) and thus supplying information to be processed according to the invention.

The micro-computer 900 preferably comprises a communication interface 902 connected to a network 903 adapted to transmit digital information. The microcomputer 900 also comprises a permanent storage means 904, such as a hard disk, as well as a reader for temporary storage means such as a disk drive 905 for cooperating with a diskette 906.

The diskette 906 and the hard disk 904 can contain can contain software installation data of the invention as well as the code of the computer program or programs whose execution by the microcomputer 900 implements the present invention, this code being for example stored on the hard disk 904 once it has been read by the microcomputer 900.

In a variant, the program or programs enabling the device 900 to implement the invention are stored in a read only memory (for example of the ROM type) 907.

According to another variant, this program or programs are received totally or partially through the communication network 903 in order to be stored as indicated.

The microcomputer 900 also comprises a screen 909 for displaying the information to be processed and/or serving as an interface with the user, so that the user can for example parameterize certain processing modes using the keyboard 910 or any other appropriate pointing and/or entering means such as a mouse, optical stylus, etc.

A calculation unit or central processing unit (CPU) 911 executes the instructions relating to the implementation of the invention, these instructions being stored in the read only memory ROM 907 or in the other storage units described. In particular, the central processing unit 911 is adapted to implement the algorithm illustrated in the flow diagram of FIG. 1.

When the device 900 is powered up, the processing programs and methods stored in one of the non-volatile memories, for example the ROM 907, are transferred into a random access memory RAM 912, which then contains the executable code of the invention as well as the variables necessary for implementing the invention.

As a variant, the method in accordance with the invention may be stored in various storage locations. In general terms, an information storage means that can be read by a computer or by a microprocessor, integrated or not in the device, and possibly removable, may store one or more programs whose execution implements each of the steps of the method described previously.

The particular embodiment chosen for the invention can be developed, for example by adding updated or enhanced processing methods; in such a case, these new methods can be transmitted to the device 900 by the communication network 903 or loaded into the device 900 via one or more diskettes 906. Naturally the diskettes 906 may be replaced by any information carrier considered appropriate (CD-ROM, memory card, etc.).

A communication bus 913 enables communication between the different elements of the micro-computer 900 and the elements connected thereto. It will be noted that the representation of the bus 913 is non-limiting. Thus the central processing unit CPU 911 may, for example, communicate instructions to any element of the micro-computer 900, directly or via another element of the micro-computer 900.

The invention claimed is:

1. A method of coding a video sequence constituted by a plurality of images each comprising at least one block of pixels, the method comprising steps of:

calculating a plurality of similarity values, in terms of a predetermined similarity metric, each of the plurality of similarity values being calculated between a block of pixels to code of a current image of the video sequence and a different one of a plurality of blocks of pixels of a reference image of the video sequence;

determining a motion vector for blocks of pixels of the reference image of the video sequence for which a similarity value has been calculated in the calculating step;

determining a block of pixels of the reference image for which a similarity value, of the plurality of similarity values, relative to the block of pixels to code of the current image is an extremum;

predicting at least one motion vector for the block of pixels to code from at least one neighboring motion vector in terms of a predetermined neighborhood, the neighboring motion vector being calculated from the block of pixels of the reference image for which the similarity value relative to the block of pixels to code of the current image is the extremum;

determining a final motion vector for the block of pixels to code from at least one of the plurality of similarity values calculated for the block of pixels to code in the calculating step and from the at least one motion vector predicted in the predicting step;

coding the block of pixels to code using the final motion vector, wherein a single predicted motion vector is predicted in the predicting step, and wherein the final motion vector is based on the predicted motion vector, a motion vector corresponding to an extremum of a similarity map and a coding cost increase for the single predicted motion vector, the coding cost being based in part on respective similarity values associated with the predicted motion vector and the motion vector corresponding to the extremum.

2. The method according to claim 1, wherein the at least one motion vector predicted in the predicting step is equal to the arithmetic mean of four motion vectors neighboring the block of pixels to code.

3. The method according to claim 1, in which the block of pixels to code has coordinates (x,y) and the block of pixels of the reference image for which the at least one similarity value is the extremum has coordinates $(x_s, y_s)$, and wherein the proximity criterion consists of selecting a plurality of blocks having coordinates that satisfy $|x-x_s|<m$ and $|y-y_s|<m$, where m is a predetermined distance.

4. The method according to claim 1, wherein the model ($\hat{S}_{xy}$) is a two-dimensional parabolic function.

5. The method according to claim 1, in which a single predicted motion vector is predicted in the predicting step, and wherein, in the step of determining the final motion vector, the final motion vector is taken as equal to the single predicted motion vector predicted in the predicting step.

6. The method according to claim 1, wherein a plurality of predicted motion vectors Vi are predicted in the predicting step, and wherein the final motion vector is defined as the barycenter of the vectors and of the plurality of predicted motion vectors Vi respectively weighted by the weights 1/Ei, where Ei designates a coding cost increase of the plurality of predicted motion vectors Vi, Ei being defined by $$Ei = \frac{\hat{S}_{xy}(Vi)}{\hat{S}_{xy}(Vmin)} - 1$$

or by $$Ei = \frac{\hat{S}_{xy}(Vmin)}{\hat{S}_{xy}(Vi)} - 1$$

where $\hat{S}_{xy}$ (Vmin) and $\hat{S}_{xy}$ (Vi) are similarity values respectively associated with Vmin and Vi0, and Vmin designates a motion vector corresponding to the extremum of the similarity map.

7. The method according to claim 1, wherein the similarity metric consists of calculating a sum or a mean of absolute values of differences between values of pixels of a block of the reference image and values of corresponding pixels of the block of pixels to code of the current image.

8. A device for coding a video sequence constituted by a plurality of images each comprising at least one block of pixels, the device comprising:
a processor, and
a memory storing instructions that, when executed, cause the device to:
calculate a plurality of similarity values, in terms of a predetermined similarity metric, each of the plurality of similarity values being calculated between a block of pixels to code of a current image of the video sequence and a different one of a plurality of blocks of pixels of a reference image of the video sequence;
determine a motion vector for blocks of pixels of the reference image of the video sequence for which a similarity value has been calculated in the calculating step;
determine a block of pixels of the reference image for which a similarity value, of the plurality of similarity values, relative to the block of pixels to code of the current image is an extremum;
predict, at least one motion vector for the block of pixels to code from at least one neighboring motion vector in terms of a predetermined neighborhood, the at least one neighboring motion vector being calculated from the block of pixels of the reference image for which the similarity value relative to the block of pixels to code of the current image is the extremum;
determine a final motion vector for the block of pixels to code from at least one of the plurality of similarity values calculated for the block of pixels to code and from the at least one motion vector predicted for the block of pixels to code;
code the block of pixels to code using the final motion vector determined for the block of pixels to code,
wherein a single predicted motion vector is predicted in the predicting, and wherein the final motion vector is based on the predicted motion vector, a motion vector corresponding to an extremum of a similarity map and a coding cost increase for the single predicted motion vector, the coding cost being based in part on respective similarity values associated with the predicted motion vector and the motion vector corresponding to the extremum.

9. A non-transitory computer-readable storage medium storing instructions that, when executed by a computer, cause the computer to perform a method of coding a video sequence constituted by a plurality of images each comprising at least one block of pixels, the method comprising steps of:
calculating a plurality of similarity values, in terms of a predetermined similarity metric, each of the plurality of similarity values being calculated between a block of pixels to code of a current image of the video sequence and a different one of a plurality of blocks of pixels of a reference image of the video sequence;
determining a motion vector for blocks of pixels of the reference image of the video sequence for which a similarity value has been calculated in the calculating step;
determining a block of pixels of the reference image for which a similarity value, of the plurality of similarity values, relative to the block of pixels to code of the current image is an extremum;
predicting at least one motion vector for the block of pixels to code from at least one neighboring motion vector in terms of a predetermined neighborhood, the neighboring motion vector being calculated from the block of pixels of the reference image for which the similarity value relative to the block of pixels to code of the current image is the extremum;
determining a final motion vector for the block of pixels to code from at least one of the plurality of similarity values calculated for the block of pixels to code in the calculating step and from the at least one motion vector predicted in the predicting step;
coding the block of pixels to code using the final motion vector,
wherein a single predicted motion vector is predicted in the predicting step, and wherein the final motion vector is based on the predicted motion vector, a motion vector corresponding to an extremum of a similarity map and a coding cost increase for the single predicted motion vector, the coding cost being based in part on respective similarity values associated with the predicted motion vector and the motion vector corresponding to the extremum.

10. The method according to claim 8, wherein the model ($\hat{S}_{xy}$) is a two-dimensional parabolic function.

11. The method according to claim 10, further comprising modeling the similarity map, so as to obtain a model ($\hat{S}_{xy}$) defined by a predetermined number of parameters.

12. The method according to claim 11, wherein the similarity map is modeled in the form of a surface.

* * * * *